United States Patent [19]

Ketcham et al.

[11] Patent Number: 4,869,534
[45] Date of Patent: Sep. 26, 1989

[54] SWIVELABLE QUICK CONNECTOR

[75] Inventors: Mark G. Ketcham, Marine City; Donald C. Walker, Pontiac, both of Mich.

[73] Assignee: Huron Products Corporation, New Haven, Mich.

[21] Appl. No.: 249,502

[22] Filed: Sep. 26, 1988

[51] Int. Cl.⁴ .............................................. F16L 35/00
[52] U.S. Cl. ..................................... 285/24; 285/276; 285/305; 285/351
[58] Field of Search ............... 285/924, 305, 327, 276, 285/317, 24, 351

[56] References Cited

U.S. PATENT DOCUMENTS

| 2,626,974 | 1/1953 | Howard et al. | 285/317 X |
| 3,314,696 | 4/1967 | Ferguson et al. | 285/305 X |
| 3,538,940 | 11/1970 | Graham | 285/317 X |
| 3,584,902 | 6/1971 | Vyse | 285/924 X |
| 4,423,892 | 1/1984 | Bartholomew | 285/924 X |

Primary Examiner—Dave W. Arola
Attorney, Agent, or Firm—Harness, Dickey, Pierce

[57] ABSTRACT

A swivelable quick connect assembly for use with tubular conduits includes a housing having an axial bore for receiving one end of the conduit, and a first retainer detachably secured to the housing and is cooperable with an annular projection on the conduit for securing the conduit in its operative position within the bore. A second retainer means demountably coupled to the housing for maintaining the connection between the conduit and the housing.

16 Claims, 2 Drawing Sheets

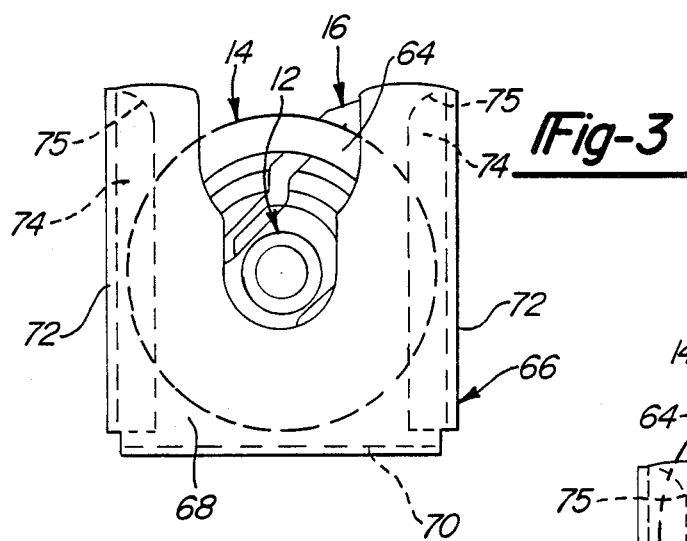
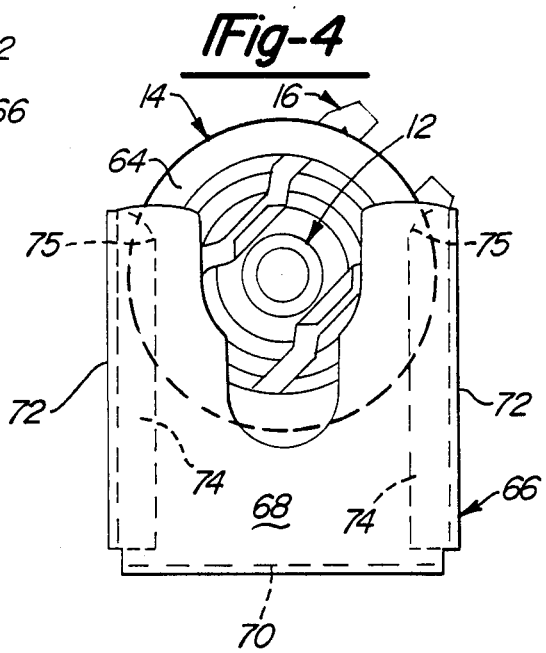
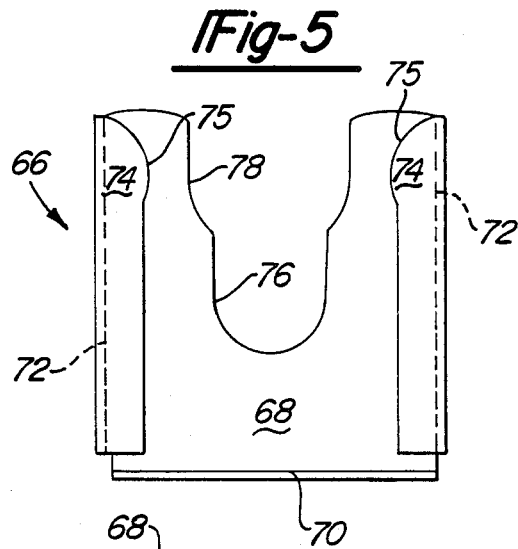
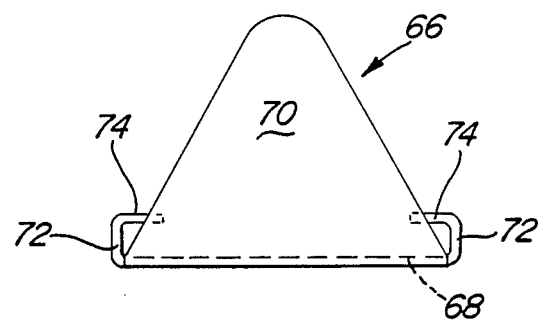
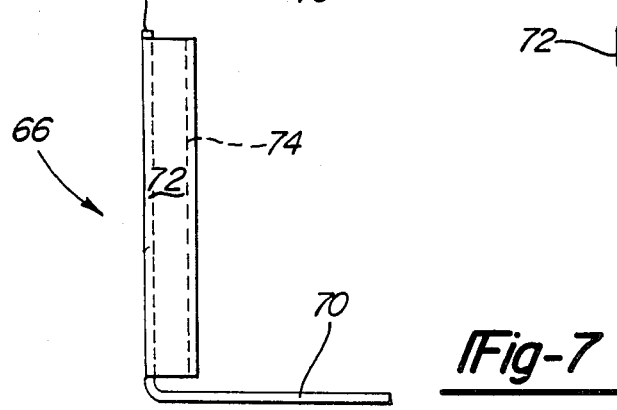

4,869,534

SWIVELABLE QUICK CONNECTOR

BACKGROUND OF THE INVENTION

1. Field of the Invention

The present invention relates to a connector assembly for providing a swivelable quick connection.

2. Description of Related Art

In the automotive industry, as well as for many other industries, the need always exists for low-cost, reliable, and easy to assemble components. This need is especially apparent with respect to providing a connection between fluid conveying conduits, such as fuel or refrigerant lines. An example of a connector assembly typically used to fill this need is disclosed in U.S. Pat. No. 4,423,892, issued Jan. 3, 1984, in the name of Donald D. Bartholomew, which is hereby incorporated by reference. Although this patented connector assembly works well, it is believed a need exists for a secondary latch for maintaining the connection between the fluid conveying conduits.

Accordingly, it is one object of the present invention to provide an improved connector assembly having a swivelable quick connection between fluid conveying conduits. It is another object of the present invention to provide a secondary latch for maintaining the connection between fluid conveying conduits.

SUMMARY OF THE INVENTION

The present invention is a connector assembly for providing a swivelable quick connection including a tubular conduit adapted to convey fluid. A housing has an axial bore means formed therein for receiving the conduit. A first retainer means is demountably coupled to the housing to resist the disconnection of the conduit from the housing. A second retainer means is demountably coupled to the housing to maintain the connection between the conduit, housing and first retainer means.

One advantage of the present invention is an improved connector assembly for providing a swivelable quick connection between fluid conveying conduits. Another advantage of the present invention is a secondary latch for maintaining the connection between the fluid conveying conduits.

BRIEF DESCRIPTION OF THE DRAWINGS

Additional objects and advantages of the present invention will become apparent from a reading of the detailed description of the preferred embodiment which makes reference to the following set of drawings in which:

FIG. 3 is a plan view of the connector assembly with a second retainer element in a closed position according to the present invention;

FIG. 4 is similar to FIG. 3 with the second retainer element in an open position;

FIG. 5 is a plan view of the second retainer element according to the present invention;

FIG. 6 is a side elevational view of the second retainer element according to the present invention; and FIG. 7 is a front elevational view of the second retainer element according to the present invention.

DETAILED DESCRIPTION OF THE PREFERRED EMBODIMENT

Figure 1:
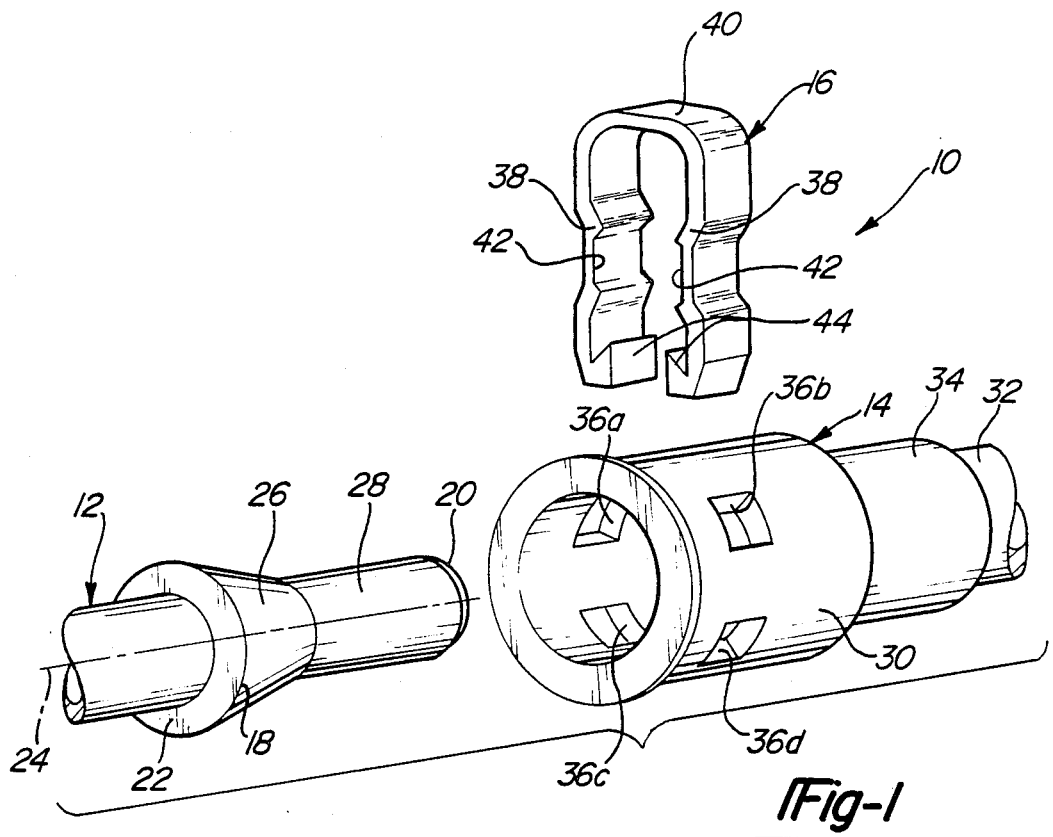
FIG. 1 is a perspective assembly view of a connector assembly according to the present invention.

Referring to FIG. 1, a perspective view of a connector assembly 10 according to the present invention is shown. The connector assembly 10 is generally comprised of a tubular conduit 12 adapted to convey fluid, a housing 14, and a first retainer element 16. The conduit 12 is provided with an outwardly projecting annular surface 18 displaced from a beveled connecting end 20 of the conduit 12. The annular surface 18 is formed with a blocking wall portion 22 disposed transversely or perpendicularly to a central axis 24 of conduit 12, and a sloping wall portion 26 gradually increasing from an outer surface 28 of the conduit.

The housing 14 may have any suitable outer surface shape, and in the present invention, the housing is provided with an enlarged diameter portion 30, a reduced diameter portion 32, and a third diameter portion 34. The housing 14 is adapted to provide for apertures or openings 36 a-d, which are equidistantly spaced around the circumference of the enlarged portion 30 of the housing 14. The apertures 36 are provided to receive and position the first retainer element 16 transversely to axis 24 of the conduit 12.

The first retainer element 16 is made from a resilient material, such as plastic, and is comprised of a pair of generally parallel elongated legs 38 joined at one end by a cross member 40, which provides a separation between the legs 38 approximately equal to the diameter of conduit 12. Each retainer leg 38 includes a sloping lead area 42 formed in the interior side of the leg 38, and an inwardly extending barb 44 at one end. The first retainer element 16 is coupled to housing 14 by deflecting legs 38 outwardly a sufficient distance to permit their insertion into apertures 36a and 36b and out through apertures 36c and 36d. When fully inserted, barbs 44 engage the lower lateral edges of apertures 36c and 36d to lock the first retainer element 16 in place.

Figure 2:
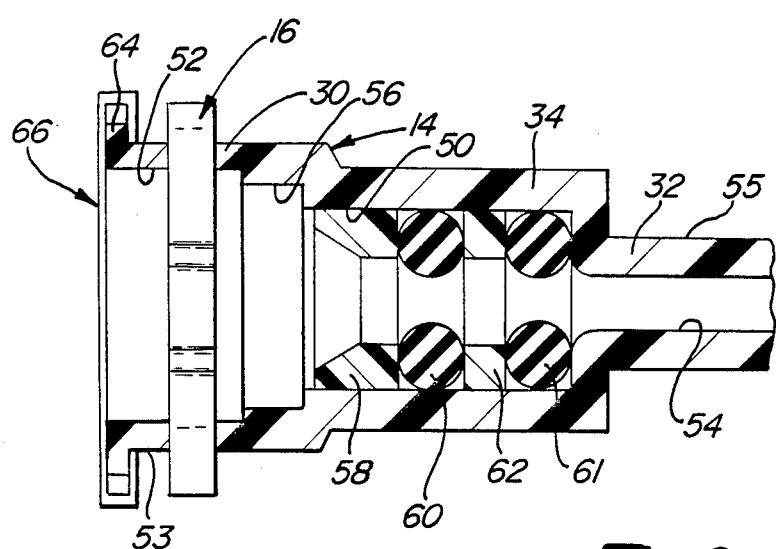
FIG. 2 is a side elevation view, in cross-section, of the connector assembly of FIG. 1.

Referring to FIG. 2, the housing 14 is shown to be formed with a central bore 50, having an enlarged diameter portion 52 at a first end 53 for receiving the conduit 12 and for mounting the first retainer element 16, a reduced diameter portion 54 at a second end 55 for providing a fluid path, and a third diameter portion 56 interposed between enlarged diameter portion 52 and the central bore 50. The housing 14 also includes a bushing 58, two elastomeric rings 60 and 61, and an annular sleeve 62 for separating the rings. This housing 14 illustrates that more than one elastomeric ring may be employed to provide a fluid tight seal, as may be required for the particular application of the connector assembly. The housing 14 further includes a ring element 64 at the first end 53. The ring element 64 is elliptical in shape and has a diameter greater than the enlarged portion 30 of the housing 14. The apertures 36 may extend to the ring element 64. The ring element 64 may have any other shape and be integral with the enlarged portion 30.

As illustrated in FIGS. 3 and 4, the ring element 64 is configured such to receive a second retainer element 66 for maintaining the connection between the conduit 12, housing 14 and first retainer element 16. As further illustrated in FIGS. 5 through 7, the second retainer element 66 has a generally planar base portion 68 and a tab portion 70 generally perpendicular to the base portion 68. The base portion 68 includes upwardly extending sidewalls 72 and inwardly extending ledges 74 at the end of the sidewalls 72. The ledges 72 include inwardly extending detents 75 at one end. The base portion 68 includes a generally "U"-shaped opening or aperture 76 of a diameter slightly larger than the conduit 12. The aperture 76 includes a generally arcuate countersunk 78 portion. The second retainer element 66 may be made of plastic or metal.

In operation, as illustrated in FIG. 4, the second retainer element 66 cooperates with the ring element 64 such that the ring element 64 is disposed between the base portion 68, side walls 72, and ledges 74 in an open or unlatched position. The second retainer element 66 is slid onto the ring element 64 and the detents 75 slightly compress the enlarged portion 30 and holds the second retainer element in the open position. As illustrated in FIG. 3, the second retainer element 66 is slid further onto the ring element 64 until the conduit 12 is disposed at the end of the aperture 76 in a closed or latched position. The detents slide past the enlarged portion 30 which expands to its former or original position. This arrangement maintains the connection while preventing longitudinal movement of the conduit 12.

While the above description constitutes the preferred embodiment of the present invention, it will be appreciated that the invention is susceptible to modification, variation and change without departing from the proper scope and fair meaning of the accompanying claims.

What is claimed is:

1. A connector assembly for providing a swivelable quick connection, comprising:
    a tubular conduit adapted to convey fluid, having outwardly projecting annular surface means, formed at a predetermined distance from an end of said conduit to be connected, for providing a blocking wall portion disposed transversely to a central axis of said conduit;
    a housing having an exterior surface and an axial bore means formed therein for receiving said conduit at a first end for providing a fluid path at a second end;
    a member projecting outwardly from the exterior surface said housing;
    first retainer means, demountably coupled to said housing, for cooperating with said blocking wall portion of said annular surface means to resist the disconnection of said conduit from said housing; and
    second retainer means demountably coupled to said outwardly projecting exterior member of said housing for maintaining the connection between said conduit and said housing.

2. An assembly as set forth in claim 1 wherein said housing exterior surface projecting member includes a peripheral ring element at one end thereof.

3. An assembly as set forth in claim 2 wherein said second retainer means comprises a retainer element having U-shaped sides for cooperating with said ring element for coupling said retainer means with said housing.

4. An assembly as set forth in claim 3 wherein said retainer element includes means forming an aperture in said retainer element for cooperating with said conduit for preventing longitudinal movement of said conduit.

5. An assembly as set forth in claim 3 wherein said U-shaped sides include a detent at one end thereof for cooperating with said housing to hold said retainer element in an open position and closed position.

6. An assembly as set forth in claim 1 wherein said bore means provides an enlarged first diameter portion at said first end of said housing, and a reduced second diameter portion at said second end of said housing.

7. An assembly as set forth in claim 6 wherein said bore means provides for a third diameter portion interposed between said first and second diameter portions, having a magnitude less than said first diameter portion and greater than said second diameter portion.

8. An assembly as set forth in claim 6 including elastomeric ring means disposed in said bore means for providing a seal between said conduit and said housing.

9. An assembly as set forth in claim 8 including annular bushing means disposing in said bore means of said housing for positioning said ring means and for guiding the insertion of said conduit into a sealing engagement with said ring means.

10. An assembly as set forth in claim 9 wherein said ring means and said bushing means are disposed in said third diameter portion of said bore means.

11. An assembly as set forth in claim 10 wherein said ring means is comprised of two elastomeric rings.

12. An assembly as set forth in claim 11 further including annular sleeve means disposed in said third portion of said bore means, for separating said elastomeric rings.

13. An assembly as set forth in claim 1 wherein said annular surface means includes a sloping wall portion facing said end of said conduit to be connected and opposing said blocking wall portion.

14. In a connector assembly for providing a swivelable quick connection, including: a tubular conduit adapted to convey fluid, having outwardly projecting annular surface means, formed at a predetermined distance from an end of said conduit to be connected, for providing a blocking wall portion disposed transversely to a central axis of said conduit, a housing having axial bore means formed therein for receiving said conduit at a first end for providing a fluid path at a second end, first retainer means, demountably coupled to said housing, for cooperating with said blocking wall portion of said annular surface means to resist the disconnection of said conduit from said housing, the improvement comprising:
    a ring element outwardly projecting from the exterior peripheral surface of said housing, said ring element positioned at one end of said housing;
    second retainer means demountably coupled to said outwardly projecting ring element of said housing for maintaining the connection between said conduit and said housing; and
    said second retainer means comprises a retainer element having U-shaped sides for cooperating with said ring element for coupling said retainer element therewith.

15. An assembly as set forth in claim 14, wherein said retainer element includes means forming an aperture in said retainer element for cooperating with said conduit for preventing longitudinal movement of said conduit.

16. An assembly as set forth in claim 15 wherein said U-shaped sides include a detent at one end thereof for cooperating with said housing to hold said retainer element in an open position and closed position.

* * * * *